United States Patent
Hao et al.

(10) Patent No.: US 11,235,678 B1
(45) Date of Patent: Feb. 1, 2022

(54) ELECTRIC VEHICLE CHARGING USING DOWNSIZED BUCK BOOST CONVERTER

(71) Applicant: GM Global Technology Operations LLC, Detroit, MI (US)

(72) Inventors: Lei Hao, Troy, MI (US); Venkata Prasad Atluri, Novi, MI (US); Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/945,123

(22) Filed: Jul. 31, 2020

(51) Int. Cl.
| | | |
|---|---|---|
| *B60L 53/00* | (2019.01) | |
| *H02J 7/00* | (2006.01) | |
| *B60L 53/62* | (2019.01) | |
| *H02M 3/158* | (2006.01) | |
| *H02J 7/34* | (2006.01) | |
| *B60L 53/18* | (2019.01) | |
| *B60L 50/60* | (2019.01) | |
| *B60L 53/20* | (2019.01) | |

(52) U.S. Cl.
CPC ............... *B60L 53/62* (2019.02); *B60L 50/66* (2019.02); *B60L 53/18* (2019.02); *B60L 53/20* (2019.02); *H02J 7/007* (2013.01); *H02J 7/0042* (2013.01); *H02J 7/342* (2020.01); *H02M 3/1582* (2013.01); *B60L 2210/12* (2013.01); *B60L 2210/14* (2013.01); *H02J 2207/20* (2020.01)

(58) Field of Classification Search
CPC ...... B60L 53/62; B60L 2210/12; B60L 53/18; B60L 53/20; B60L 50/66; H02J 7/0042; H02J 7/342; H02J 2207/20; H02J 7/007; H02M 3/1582

USPC ......................................................... 320/104
See application file for complete search history.

(56) References Cited

U.S. PATENT DOCUMENTS

| | | | | |
|---|---|---|---|---|
| 7,279,867 | B2 * | 10/2007 | Benckenstein, Jr. et al. ............... H02J 7/0016 320/112 |
| 7,973,516 | B2 * | 7/2011 | Flack ..................... B65H 75/38 320/137 |
| 9,450,274 | B2 * | 9/2016 | Vo et al. ................. H02J 7/342 |
| 9,698,598 | B2 * | 7/2017 | Ballatine et al. ........ B60L 53/67 |
| 10,074,997 | B2 * | 9/2018 | Vo et al. ................. H02J 7/342 |
| 10,305,298 | B2 * | 5/2019 | Kristensen ............ H02J 7/0016 |
| 10,790,662 | B2 * | 9/2020 | Sharifipour et al. .. H02M 5/458 |

* cited by examiner

*Primary Examiner* — Sun J Lin
(74) *Attorney, Agent, or Firm* — Vivacqua Crane PLLC

(57) ABSTRACT

A charging system of an electrical automobile vehicle includes a converter unit and a first energy storage system of within a first automobile vehicle. A charging cable is releasably connected from the first energy storage system to a charging station or is releasably connected to a second energy storage system of a second automobile vehicle. A vehicle charging controller is connected to the converter unit and programmed to communicate with the charging station and to the second energy storage system. A plurality of low-loss switching devices of the converter unit are selectively operated by signals from the vehicle charging controller to position the plurality of low-loss switching devices in an on-state (ON) or an off-state (OFF) to control charging the first energy storage system from the charging station or charging the second energy storage system from the first energy storage system.

20 Claims, 6 Drawing Sheets

ELECTRIC VEHICLE CHARGING USING DOWNSIZED BUCK BOOST CONVERTER

INTRODUCTION

The present disclosure relates to electrical powered automobile vehicles and charging of electrical powered vehicle batteries.

Electrically powered or electrical vehicles (EVs) commonly use a 400 direct current volt (VDC) battery, normally charged from a home electrical system over approximately an 8 to 24 hour charging period, or a 400 VDC charging station. Battery charging times may be improved using higher voltage (e.g., 800 VDC) charging stations which are replacing 400 VDC charging stations, however existing EV system architecture may not support connection to an 800 VDC charging station. In addition, vehicle-to-vehicle charging to assist vehicles which have depleted battery capacity, particularly when a charging station is not available, is not currently supported for many EV architectures.

Thus, while current EV charging systems and architectures achieve their intended purpose, there is a need for a new and improved charging system of an automobile vehicle.

SUMMARY

According to several aspects, a charging system of an electrical automobile vehicle includes a converter unit within a first automobile vehicle and a first energy storage system of the first automobile vehicle. A charging cable is releasably connected from the first energy storage system to a charging station or is releasably connected to a second energy storage system of a second automobile vehicle. A vehicle charging controller is connected to the converter unit and programmed to communicate with the charging station and to the second energy storage system. A plurality of low-loss switching devices of the converter unit are selectively operated by signals from the vehicle charging controller to position the plurality of low-loss switching devices in an on-state (ON) or an off-state (OFF) to control charging the first energy storage system from the charging station or charging the second energy storage system from the first energy storage system.

In another aspect of the present disclosure, the converter unit includes: a charge port individually connected to a positive bus and a negative bus; and a bi-directional DC/DC (BDD) converter, for example a buck boost converter connected to the positive bus and the negative bus.

In another aspect of the present disclosure, the bi-directional DC/DC converter can be a converter with or without a bypass switch. The DC/DC converter with bypass switch will include a feature to bypass the DC/DC converter from a drive system in certain drive conditions, for example, if a required power is greater than a threshold.

In another aspect of the present disclosure, a first one (SS1) of the plurality of low-loss switching devices releasably connects the charge port to the positive bus of the first energy storage system; and a second one (SS2) of the plurality of low-loss switching devices releasably connects the charge port to the negative bus of the first energy storage system.

In another aspect of the present disclosure, a third one (SS3) of the plurality of low-loss switching devices releasably connects the charge port to the positive bus of an input of the BDD converter; and a fourth one (SS4) of the plurality of low-loss switching devices releasably connects the charge port to the negative bus of an input of the BDD converter.

In another aspect of the present disclosure, the converter unit includes: a battery; a first battery switch defining a fifth one (SS5) of the plurality of low-loss switching devices connecting the battery to the positive bus; a second battery switch defining a sixth one (SS6) of the plurality of low-loss switching devices connecting the battery to the negative bus; and a pre-charging resistor connected to the battery and connected to or isolated from the positive bus using a pre-charging contactor defining a third battery switch (SS-PC).

In another aspect of the present disclosure, during a driving operation of the first automobile vehicle, the plurality of low-loss switching devices and the BDD converter are positioned as follows: SS1, SS2, SS3, SS4 are OFF; SS5 and SS6 are ON; SS-PC is OFF; and the BDD converter is either energized ON or bypassed depending on a drive condition.

In another aspect of the present disclosure, during a pre-charging operation of the first automobile vehicle, the plurality of low-loss switching devices and the BDD converter are positioned as follows: SS1, SS2, SS3, SS4 are OFF; SS5 is OFF; SS6 is ON; SS-PC is ON; and the BDD converter is energized OFF.

In another aspect of the present disclosure, during a charging operation of the second energy storage system using the first energy storage system, the plurality of low-loss switching devices and the BDD converter are positioned as follows: SS1, SS2 are OFF; SS3, SS4 are ON; SS5 and SS6 are ON; SS-PC is OFF; and the BDD converter is energized ON.

In another aspect of the present disclosure, during a charging operation of the first energy storage system from a compatible charging station, for example the first energy storage system is 400V and the charging station is also 400V, the plurality of low-loss switching devices and the BDD converter are positioned as follows: SS1, SS2 are ON; SS3, SS4 are OFF; SS5 and SS6 are ON; SS-PC is OFF; and the BDD converter is energized OFF.

In another aspect of the present disclosure, during a charging operation of the first energy storage system from an incompatible charging station, for example, first energy storage system is 800V and the charging station is 400V, the plurality of low-loss switching devices and the BDD converter are positioned as follows: SS1, SS2 are OFF; SS3, SS4 are ON; SS5 and SS6 are ON; SS-PC is OFF; and the BDD converter is energized ON. The feature that uses 400V to charge the 800V energy storage system is referred as backward compatibility.

In another aspect of the present disclosure, the converter unit includes: a module package having a traction power inverter module, an accessory power module and an air conditioning compressor module; and an integrated power electronics module. The module package and the integrated power electronics module are connected across the positive bus and the negative bus.

In another aspect of the present disclosure, the converter unit includes: a seventh one (SS7) of the plurality of low-loss switching devices releasably connecting the module package and the integrated power electronics module to the positive bus; and an eighth one (SS8) of the plurality of low-loss switching devices releasably connecting the module package and the integrated power electronics module to the negative bus. During a driving operation of the first automobile vehicle SS7 and SS8 are ON; and during a pre-charging operation of the first automobile vehicle; during a charging operation of the second energy storage system using the first energy storage system, and during a charging operation of the first energy storage system from the charging station SS7 and SS8 are OFF.

According to several aspects, a charging system of an electrical automobile vehicle includes a converter unit within a first automobile vehicle having a BDD converter connected to a positive bus and a negative bus. A charge port is connected to the positive bus and a negative bus. A first energy storage system of the first automobile vehicle including a battery. A charging cable is releasably connected from the first energy storage system via the charge port to a charging station or releasably connected to a second energy storage system of a second automobile vehicle. A vehicle charging controller is connected to the converter unit and programmed to communicate with the charging station and to the second energy storage system. A plurality of low-loss switching devices of the converter unit are selectively operated by signals from the vehicle charging controller to position the plurality of low-loss switching devices in an on-state (ON) or an off-state (OFF) to control charging the first energy storage system from the charging station or charging the second energy storage system from the first energy storage system.

In another aspect of the present disclosure, the plurality of low-loss switching devices includes: a first one (SS1) releasably connecting the charge port to the positive bus; a second one (SS2) releasably connecting the charge port to the negative bus; a third one (SS3) releasably connecting the charge port to a positive bus input of the BDD converter; a fourth one (SS4) releasably connecting the charge port to a negative bus input of the BDD converter; a fifth one (SS5) defining a first battery switch releasably connecting the battery to the positive bus; and a sixth one (SS6) defining a second battery switch releasably connecting the battery to the negative bus.

In another aspect of the present disclosure, a pre-charging resistor is connected to the battery and is connected to or isolated from the positive bus using a pre-charging contactor defining a third battery switch (SS-PC).

In another aspect of the present disclosure, switching logic includes:

| Switching logic for various operating modes | | | | | | | | |
| --- | --- | --- | --- | --- | --- | --- | --- | --- |
| | SS1 | SS2 | SS3 | SS4 | SS5 | SS6 | SS-PC | BDD |
| Normal driving | OFF | OFF | OFF | OFF | ON | ON | OFF | ON |
| Pre-charging | OFF | OFF | OFF | OFF | OFF | ON | ON | OFF |
| Charging second vehicle ESS | OFF | OFF | ON | ON | ON | ON | OFF | ON |
| Charging from the compatible grid | ON | ON | OFF | OFF | ON | ON | OFF | OFF |
| Charging from the incompatible grid | OFF | OFF | ON | ON | ON | ON | OFF | ON |

In another aspect of the present disclosure, a seventh one (SS7) of the plurality of low-loss switching devices releasably connects a module package and an integrated power electronics module to the positive bus; and an eighth one (SS8) of the plurality of low-loss switching devices releasably connects the module package and the integrated power electronics module to the negative bus.

In another aspect of the present disclosure, switching logic includes:

| Switching logic for various operating modes | | | | | | | | | | |
| --- | --- | --- | --- | --- | --- | --- | --- | --- | --- | --- |
| | SS1 | SS2 | SS3 | SS4 | SS5 | SS6 | SS7 | SS8 | SS-PC | BDD |
| Normal driving | OFF | OFF | OFF | OFF | ON | ON | ON | ON | OFF | ON |
| Pre-charging | OFF | OFF | OFF | OFF | OFF | ON | OFF | OFF | ON | OFF |
| Charging second vehicle ESS | OFF | OFF | ON | ON | ON | ON | OFF | OFF | OFF | ON |
| Charging from the compatible grid | ON | ON | OFF | OFF | ON | ON | OFF | OFF | OFF | OFF |
| Charging from the incompatible grid | OFF | OFF | ON | ON | ON | ON | OFF | OFF | OFF | ON |

In another aspect of the present disclosure, the battery defines a first battery and a second battery, and wherein the plurality of low-loss switching devices includes: a first one (SS1) releasably connecting the charge port to the positive bus; a second one (SS2) releasably connecting the charge port to the negative bus; a third one (SS3) releasably connecting the charge port to the positive bus of an input of the BDD converter; a fourth one (SS4) releasably connecting the charge port to the negative bus of an input of the BDD converter; a fifth one (SS5) defining a first battery switch releasably connecting the first battery to the bus; a sixth one (SS6) defining a second battery switch releasably connecting the first battery to the negative bus; a seventh one (SS7) defining a first battery switch releasably connecting the second battery to the positive bus; an eighth one (SS8) defining a second battery switch releasably connecting the second battery to the negative bus; and a ninth one (SS9) connecting the first battery to the second battery; and further including switching logic including:

FIG. 2 is a diagram of a first converter unit for a first topology of the system of FIG. 1;

FIG. 3 is a diagram of a second converter unit for a second topology of the system of FIG. 1;

FIG. 4 is a flow diagram for operation of the systems having the first converter and the second converter of the present disclosure;

FIG. 5 is a diagram of a third converter unit for a third topology of the system of FIG. 1; and FIG. 6 is a flow diagram for operation of the systems having the third converter of the present disclosure.

DETAILED DESCRIPTION

The following description is merely exemplary in nature and is not intended to limit the present disclosure, application, or uses.

Referring to FIG. 1, a charging system of an electrical automobile vehicle 10 and an apparatus for charging an

| Switching logic for various operating modes | | | | | | | | | | | | | |
|---|---|---|---|---|---|---|---|---|---|---|---|---|---|
| | SS1 | SS2 | SS3 | SS4 | SS5 | SS6 | SS7 | SS8 | SS9 | SS10 | SS11 | SS-PC | BDD |
| Normal driving | OFF | OFF | OFF | OFF | ON | ON | ON | ON | OFF | ON | ON | OFF | ON |
| Pre-charging | OFF | OFF | OFF | OFF | OFF | ON | OFF | OFF | OFF | OFF | OFF | ON | OFF |
| Charging second vehicle ESS (400 V) | OFF | OFF | ON | ON | ON | ON | ON | ON | OFF | OFF | OFF | OFF | ON |
| Charging second vehicle ESS (800 V) | OFF | OFF | ON | ON | OFF | ON | ON | OFF | ON | OFF | OFF | OFF | ON |
| Charging from the grid (400 V) | ON | ON | OFF | OFF | ON | ON | ON | ON | OFF | OFF | OFF | OFF | OFF |
| Charging from the grid (800 V) | ON | ON | OFF | OFF | OFF | ON | ON | OFF | ON | OFF | OFF | OFF | OFF |

According to several aspects, a method for charging an electrical automobile vehicle includes: connecting a BDD converter to a converter unit within a first automobile vehicle; connecting the BDD converter and a charge port to a positive bus and a negative bus; providing a first energy storage system in the first automobile vehicle including a battery; releasably connecting a charging cable from the first energy storage system via the charge port to a charging station to charge the first energy storage system battery or releasably connecting the charging cable to a second energy storage system of a second automobile vehicle; programming a vehicle charging controller connected to the converter unit to communicate with the charging station and to the second energy storage system; and selectively operating a plurality of low-loss switching devices of the converter unit using signals from the vehicle charging controller to position the plurality of low-loss switching devices in an on-state (ON) or an off-state (OFF) to control charging the first energy storage system from the charging station or charging the second energy storage system from the first energy storage system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
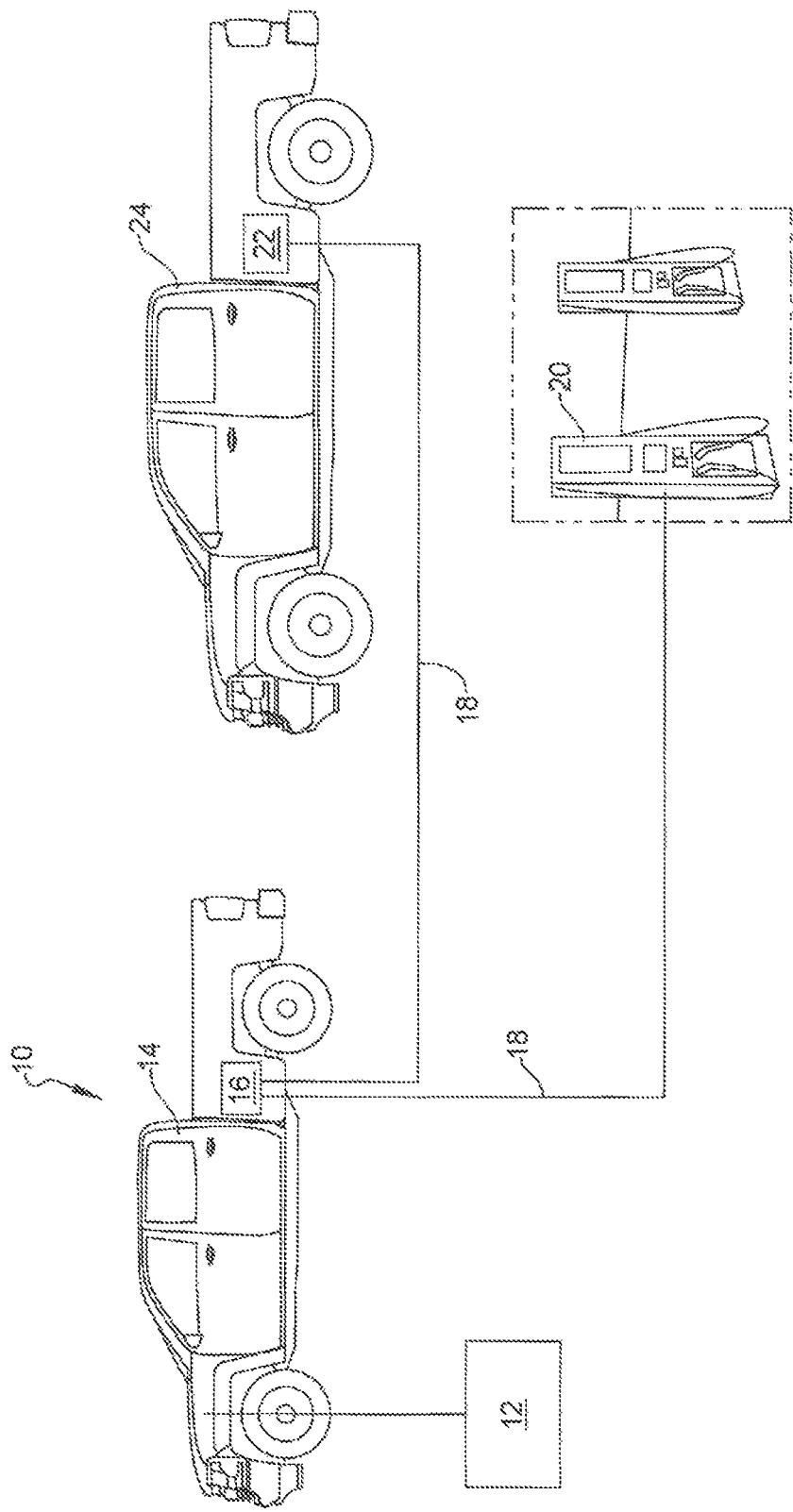
FIG. 1 is a diagrammatic presentation of vehicles adapted for use of a charging system of an automobile vehicle according to an exemplary aspect.

electrical vehicle includes a first converter unit 12 within a first automobile vehicle 14. The first automobile vehicle 14 also includes an energy storage system 16 which may be charged using a charging cable 18 connected from the energy storage system 16 to a charging station 20. According to several aspects, the charging station 20 may have a 400 direct current volts (VDC) or an 800 VDC capacity. The energy storage system 16 of the first automobile vehicle 14 may also be connected and controlled using the converter unit 12 to charge a battery unit 22 of a second automobile vehicle 24 using the charging cable 18 of the first automobile vehicle 14, or by a charging cable (not shown) of the second automobile vehicle 24 connected to a charging port shown and described in reference to FIG. 2 of the first converter unit 12 of the first automobile vehicle 14.

Referring to FIG. 2 and again to FIG. 1, for operation in a first topology or Topology I, according to several aspects the first converter unit 12 includes a buck-boost converter defining a DC-to-DC converter having an output voltage magnitude that is either greater than or less than an input voltage magnitude. The first converter unit 12 provides a charge port 26 individually connected to a positive bus 28 and a negative bus 30. In addition to the energy storage system 16, a buck-boost converter 32 defining a down-sized buck-boost (BDD) converter having a bypass switch, or a full size DC/DC converter without a bypass switch, a module package 34, an integrated power electronics module 36 and a contactor set 38 are connected across the positive bus 28 and the negative bus 30.

The contactor set 38 includes multiple low-loss switching devices such as a first switch 40 (SS1) in the positive bus 28 and a second switch 42 (SS2) in the negative bus 30. The contactor set 38 further includes a third switch 44 (SS3) connected to the positive bus 28 of the buck-boost converter 32. The contactor set 38 further includes a fourth switch 48 (SS4) in a second bypass line 50 connected to the negative bus 30 of the buck-boost converter 32. According to several aspects the switches SS1; SS2, SS3 and SS4 of the contactor set 38 may be mechanical relays or solid-state switches.

The energy storage system 16 may include a battery 52 of 400 VDC capacity or of 800 VDC capacity. A first battery switch 54 (SS5) connects the battery 52 to the positive bus 28 and a second battery switch 56 (SS6) connects the battery 52 to the negative bus 30. A resistor 56 connected to the battery 52 may be connected to or isolated from the positive bus 28 using a pre-charging contactor defining a third battery switch 60 (SS-PC). According to several aspects the switches SS5, SS6 and SS-PC, similar to switches SS1, SS2, SS3 and SS4 of the contactor set 38 may be mechanical relays or solid-state switches.

In the present disclosure, the term "low-loss switching device" means a solid-state relay and/or an electromechanical relay. A solid-state relay has no moving parts but instead uses the electrical and optical properties of solid-state semiconductors to perform its input to output isolation and switching functions. As non-limiting examples, solid-state relays include MOS-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings. The low-loss switching devices may be electromechanical relays in parallel with solid state switches to further reduce the on-state conduction loses. During operation, the solid-state switches carry the current during switching from on-to-off or off-to-on state of an electromechanical relay to eliminate arcing. The term "low-loss switching device" does not include strictly mechanical switches, because it is desirable to minimize the risk of the mechanical contacts from welding together. The low-loss switching devices are also optimized for low voltage drop.

The BDD converter 32 may include multiple converter switches such as a first converter switch 62. A converter inductor 64 and a charge capacitor 66 are also provided with the BDD converter 32.

The module package 34 may include a traction power inverter module 68, an accessory power module 70 for providing power to the vehicle accessories, such as a radio, and an air conditioning compressor module 72, which is configured to control the air conditioning of a passenger cabin of the first automobile vehicle 14. These modules are individually connected across the positive bus 28 and the negative bus 30.

The various switches or switching devices of the first converter unit 12 are individually actuated by switching logic signals generated by a charging controller 74. The first automobile vehicle 14 provides the vehicle charging controller 74 to establish a wireless and/or wired communication link with the charging station 20. A communication network (such as CAN, WAN, Blue-Tooth, Wi-Fi), can establish the wireless and/or wired communication between the charging station 20 and the vehicle charging controller 74. As a result, the vehicle charging controller 74 can communicate wirelessly and/or via wire with the vehicle charging station 20. The first automobile vehicle 14 may also include a Global Positioning System (GPS) to determine the location of the first automobile vehicle 14 with respect to the charging station 20. The vehicle charging controller 74 includes a processor and a non-transitory memory in communication with the processor. The non-transitory memory can store instructions that can be executed by the processor as is known.

Each of the low-loss switching devices has an on-state and an off-state. Positions for the various switches for different operating conditions will be discussed in reference to Topology I or Topology II described below. The charge receptacle or charge port 26 is configured to electrically charge the electrical vehicle such as the automobile vehicle 14, and the vehicle charging controller 74 is programmed to establish a wireless and/or a wired communication with the charging station 20. The vehicle charging controller 74 is also programmed to wirelessly receive a wireless signal from the charging station 20. The wireless signal is indicative of a charging voltage of the charging station 20. The plurality of low-loss switching devices are selectively connected to the rechargeable energy storage device 16. Each of the plurality of low-loss switching devices is in communication with the vehicle charging controller 74. The vehicle charging controller 74 is programmed to selectively actuate the plurality of low-loss switching devices based on the charging voltage of the charging station 20 or the charging voltage of the battery such that a nominal voltage of the energy storage system 16 matches the charging voltage of the charging station 20.

Figure 2:
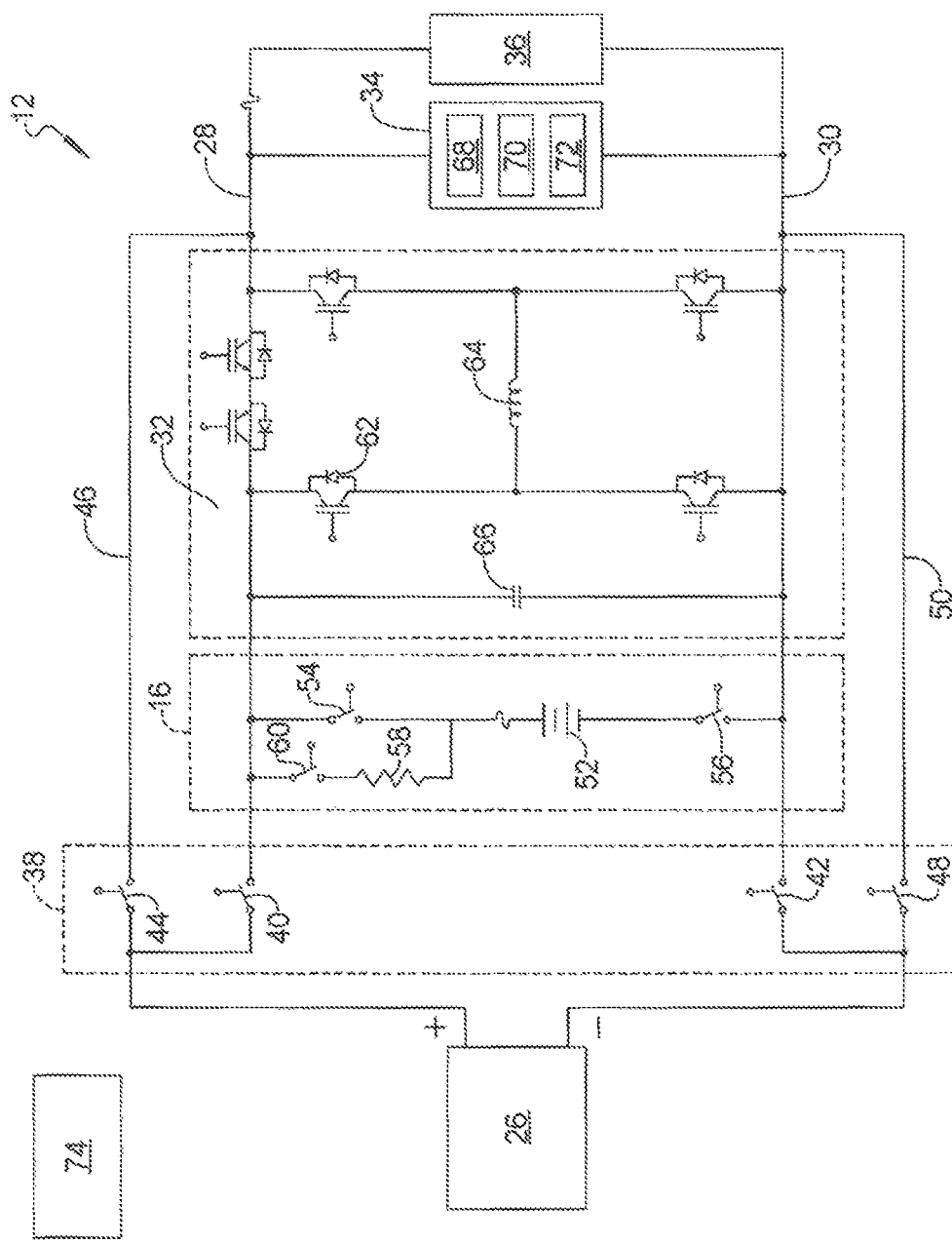

Referring to FIG. 3 and again to FIG. 2, for operation in a second topology or Topology II, according to several aspects a second converter unit 76 is modified from the configuration of the first converter unit 12 discussed in reference to FIG. 2, with the addition of two isolation switches which allow disconnection of the drive system during a charging operation. A first isolation switch SS7 is positioned in the positive bus 28 between the connection of the first bypass line 46 and the module package 34. A second isolation switch SS8 is positioned in the negative bus 30 between the connection of the second bypass line 50 and the module package 34. According to several aspects the first isolation switch SS7 and the second isolation switch SS8, similar to switches SS1, SS2, SS3 and SS4 of the contactor set 38 may be mechanical relays or solid-state switches.

Figure 3:
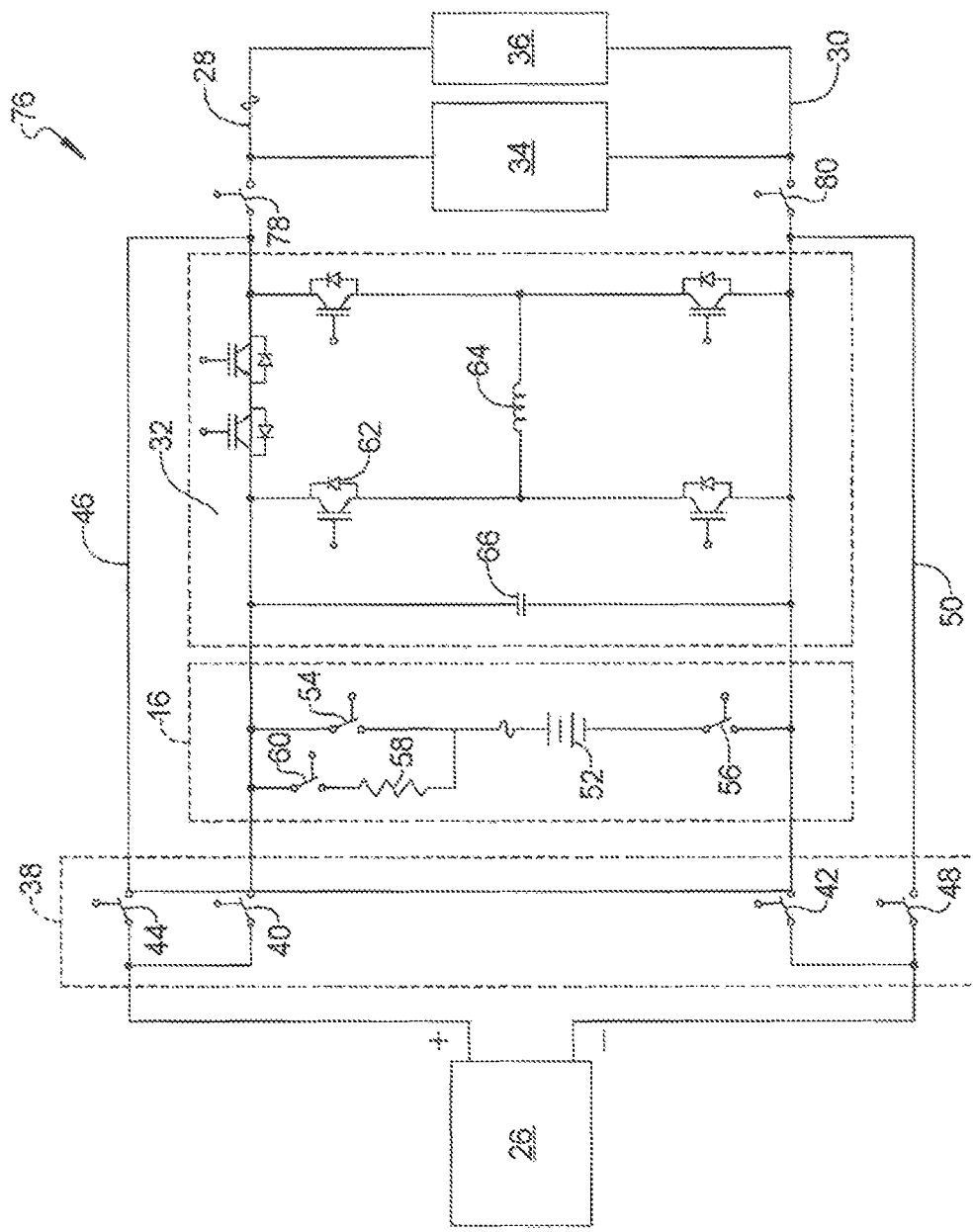
Figure 4:
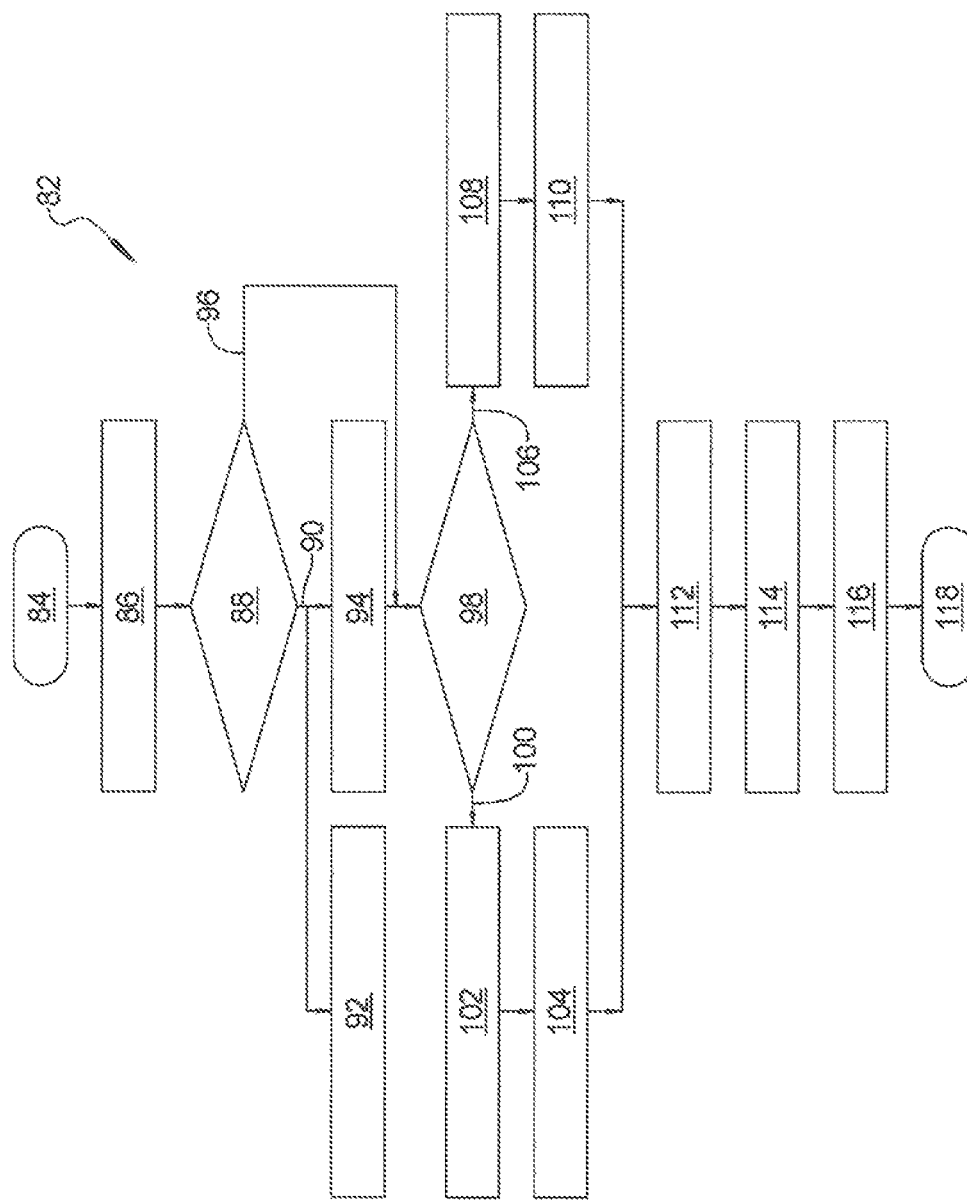

Referring to FIG. 4 and again to FIGS. 1 through 3, using an operation chart 82 a method for operating the charging system for the electrical automobile vehicle 10 of the present disclosure may include the following. Following an operation start 84 a check 86 is performed to determine a charging port 26 status and voltage. In a voltage comparison 88 a voltage comparison is made if the charging port 26 voltage is greater than a vehicle operating voltage. If a response to the comparison is a YES response 90, the program determines if the Topology I or the Topology II operation is desired based on input received from the vehicle operator of the first automobile vehicle 14.

For Topology I operation the vehicle drive system is connected and a backward compatibility is enabled, for example the second automobile vehicle 24 with a 400 V battery may be charged using the first automobile vehicle having an 800 V vehicle battery, or the first automobile vehicle 14 vehicle having an 800 V battery may be charged from a 400 V charging station. For Topology I operation, the charge capacitor 66 is pre-charged to avoid interference between the system being charged and the vehicle drive system voltage. In a Topology I step 92 an error signal is sent to the operator of the automobile vehicle by the controller 74 and the switches SS1, SS2, SS3, SS4 are kept open (OFF) or logic signals are sent to open any of the switches SS1, SS2, SS3, SS4 that may be closed.

For Topology II operation the vehicle drive system is disconnected and more charging operations are enabled, for example an 800 V battery may be charged using an 400 V vehicle battery or a vehicle having a 400 V battery may be charged from an 800 V charging station. For Topology II operation, in a Topology II operation 94 the isolation switches SS7, SS8 are disconnected or opened (OFF) or logic signals are sent to open any of the switches SS7, SS8 that may be closed.

Upon the completion of either the Topology I step 92 or the Topology II step 94, or if the response to the comparison performed in the voltage comparison 88 is a NO response 96, a charging request step 98 is performed to determine if charging is requested for another vehicle. Input for the charging request step 98 may be received from the vehicle operator of the first automobile vehicle 14. If a response to the charging request step 98 is a YES signal 100, an adjust battery voltage operation 102 is performed which closes switches SS5, SS6, and the first converter unit 12 or the second converter unit 76 adjusts battery voltage to the charging port 26 voltage. In a following vehicle charging operation 104 logic signals are generated and sent to close the switches SS3 and SS4 to begin charging operation of the second automobile vehicle 24 to achieve a commanded power transfer.

If a response to the charging request step 98 is a NO signal 106, an adjust battery voltage operation 108 is performed which closes switches SS3, SS4, and the first converter unit 12 or the second converter unit 76 adjusts battery voltage to the charging port 26 voltage. In a following battery charging operation 110 logic signals are generated and sent to close the switches SS5 and SS6 to begin charging operation of the battery 52 to achieve a commanded power transfer.

Upon completion of either the vehicle charging operation 104 or the battery charging operation 110 an end charging operation 112 is performed. The first converter unit 12 or the second converter unit 76 ends charging after the commanded power has been transferred. Following the end charging operation 112, if Topology II operation has been elected a reduce voltage operation 114 is performed wherein switches SS3, SS4 are signaled to open and the DC bus voltage is reduced to the vehicle operating voltage. Switches SS5, SS6 are then signaled to open. In an end Topology II operation 116, switches SS7 and SS8 are signaled to close. An end operation signal 118 is then generated.

Switching logic for the switches of the first converter unit 12 for Topology I operation are shown in Table 1 as follows:

TABLE 1

Switching logic for various operating modes

|  | SS1 | SS2 | SS3 | SS4 | SS5 | SS6 | SS-PC | BDD |
|---|---|---|---|---|---|---|---|---|
| Normal driving | OFF | OFF | OFF | OFF | ON | ON | OFF | ON |
| Pre-charging | OFF | OFF | OFF | OFF | OFF | ON | ON | OFF |
| Charging second vehicle ESS | OFF | OFF | ON | ON | ON | ON | OFF | ON |
| Charging from the compatible grid | ON | ON | OFF | OFF | ON | ON | OFF | OFF |
| Charging from the incompatible grid | OFF | OFF | ON | ON | ON | ON | OFF | ON |

Off or open switch positions and On or closed switch positions are indicated for multiple vehicle operating modes in Topology I operation.

Switching logic for the switches of the second converter unit 76 for Topology II operation are shown in Table 2 as follows:

TABLE 2

Switching logic for various operating modes

|  | SS1 | SS2 | SS3 | SS4 | SS5 | SS6 | SS7 | SS8 | SS-PC | BDD |
|---|---|---|---|---|---|---|---|---|---|---|
| Normal driving | OFF | OFF | OFF | OFF | ON | ON | ON | ON | OFF | ON |
| Pre-charging | OFF | OFF | OFF | OFF | OFF | ON | OFF | OFF | ON | OFF |
| Charging second vehicle ESS | OFF | OFF | ON | ON | ON | ON | OFF | OFF | OFF | ON |
| Charging from the compatible grid | ON | ON | OFF | OFF | ON | ON | OFF | OFF | OFF | OFF |
| Charging from the incompatible grid | OFF | OFF | ON | ON | ON | ON | OFF | OFF | OFF | ON |

As shown above, for normal driving, pre-charging charging from a second vehicle ESS and charging from an incompatible grid, switches SS1, SS2 are open, and switches SS1, SS2 are closed only for charging from a compatible grid (charging station). Switches SS3, SS4 are only closed for charging from a second vehicle ESS and charging from an incompatible grid. SS5 is only open for pre-charging operation and SS6 is always closed.

Figure 5:
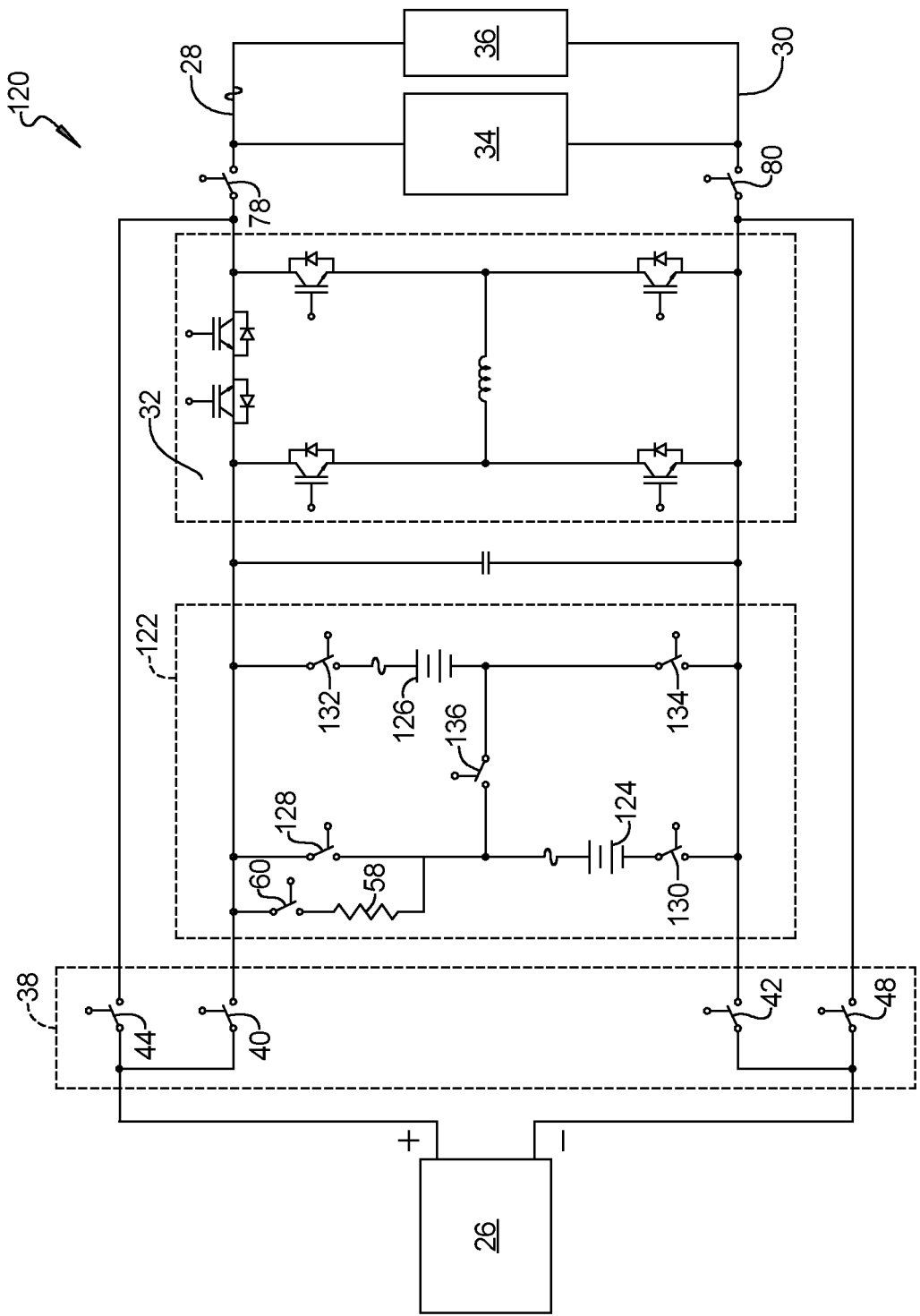

Referring to FIG. 5 and again to FIGS. 1 through 4, a Topology III operation may also be provided. For operation in the third topology or Topology III, according to several aspects a third converter unit 120 is modified from the configuration of the first converter unit 12 and the second converter unit 76 discussed in reference to FIGS. 2 and 3, with the provision of a dual battery pack 122. The dual battery pack 122 includes a first battery 124 and a second battery 126 which may be connected in parallel or in series. A fourth battery switch 128 (SS5 in table 3 below) connects the first battery 124 to the positive bus 28 and a fifth battery switch 130 (SS6 in table 3) connects the first battery 124 to the negative bus 30. A sixth battery switch 132 (SS7 in table 3) connects the second battery 126 to the positive bus 28 and a seventh battery switch 134 (SS8 in table 3) connects the second battery 126 to the negative bus 30. An eighth battery switch 136 (SS9 in table 3) cross connects or disconnects the first battery 124 and the second battery 126 allowing series or parallel operation of the first battery 124 and the second battery 126. The first isolation switch 78 (SS10 in table 3) and the second isolation switch 80 (SS11 in table 3) function the same as the first isolation switch SS7 and the second isolation switch SS8 discussed above with respect to FIG. 3. Remaining components shown in FIG. 5 are similar in function to the components identified in reference to FIG. 3.

According to several aspects the switches of the third converter unit, similar to switches SS1, SS2, SS3 and SS4 of the contactor set 38 and the first isolation switch SS7 and the second isolation switch SS8 may be mechanical relays or solid-state switches.

Topology III operation enables more charging options with different voltage levels. For example, charging may be conduction by charging an 800V battery using a 400V vehicle, or charging a 400V vehicle using an 800V charging station.

Switching logic for the switches of the third converter unit 120 for Topology III operation are shown in Table 3 as follows:

such as the second automobile vehicle 24 is desired. This determination may be based on input received from the vehicle operator of the first automobile vehicle 14. If a response to the charging determination 144 is a YES response 146, the program determines in a battery voltage check 148 if a battery voltage of the other vehicle is 400V. If a response to the battery voltage check 148 is a YES response 150, in a first command step 152 commands are sent to close SS5 (fourth battery switch 128), SS6 (fifth battery switch 130), SS7 (sixth battery switch 132) and SS8 (seventh battery switch 134), and the BDD 32 adjusts battery voltage to the charging port 26 voltage.

If a response to the battery voltage check 148 is a NO response 154, in a second command step 156 commands are sent to close SS7 (sixth battery switch 132), SS8 (seventh battery switch 134), SS9 (eighth battery switch 136) and the BDD 32 adjusts battery voltage to the charging port 26 voltage.

Following one of the first command step 152 or the second command step 156 in a closing step 158 commands are sent to close the third switch 44 (SS3 in table 3) connected to the positive bus 28 and the fourth switch 48 (SS4 in table 3) connected to the negative bus 30 which allows charging operation start for the other or second vehicle. In a following control operation 160 the BDD 32 controls the charging power and ends charging action when a commanded power has been transferred to the other or second vehicle. In a following opening operation 162 commands are sent to open the third switch 44 (SS3 in table 3) and the fourth switch 48 (SS4 in table 3) and the BDD 32 reduces bus voltage to an operating voltage of the first automobile vehicle 14.

If a response to the charging determination 144 is a NO response 164, the program determines in a grid voltage check 166 if a grid voltage for charging operation is 400V. If a response to the grid voltage check 166 is a YES response 168, in a command step 170 commands are sent to close SS5 (fourth battery switch 128), SS6 (fifth battery switch 130), SS7 (sixth battery switch 132) and SS8 (seventh battery switch 134). If a response to the grid voltage check 166 is a NO response 172, in a command step 174 commands are sent to close SS6 (fifth battery switch 130), SS7 (sixth battery switch 132) and SS9 (eighth battery switch 136).

Following either the command step 170 or the command step 174, in a closing step 176 commands are sent to close

TABLE 3

Switching logic for various operating modes

| | SS1 | SS2 | SS3 | SS4 | SS5 | SS6 | SS7 | SS8 | SS9 | SS10 | SS11 | SS-PC | BDD |
|---|---|---|---|---|---|---|---|---|---|---|---|---|---|
| Normal driving | OFF | OFF | OFF | OFF | ON | ON | ON | ON | OFF | ON | ON | OFF | ON |
| Pre-charging | OFF | OFF | OFF | OFF | OFF | ON | OFF | OFF | OFF | OFF | OFF | ON | OFF |
| Charging second vehicle ESS (400 V) | OFF | OFF | ON | ON | ON | ON | ON | ON | OFF | OFF | OFF | OFF | ON |
| Charging second vehicle ESS (800 V) | OFF | OFF | ON | ON | OFF | ON | ON | OFF | ON | OFF | OFF | OFF | ON |
| Charging from the grid (400 V) | ON | ON | OFF | OFF | ON | ON | ON | ON | OFF | OFF | OFF | OFF | OFF |
| Charging from the grid (800 V) | ON | ON | OFF | OFF | OFF | ON | ON | OFF | ON | OFF | OFF | OFF | OFF |

Figure 6:
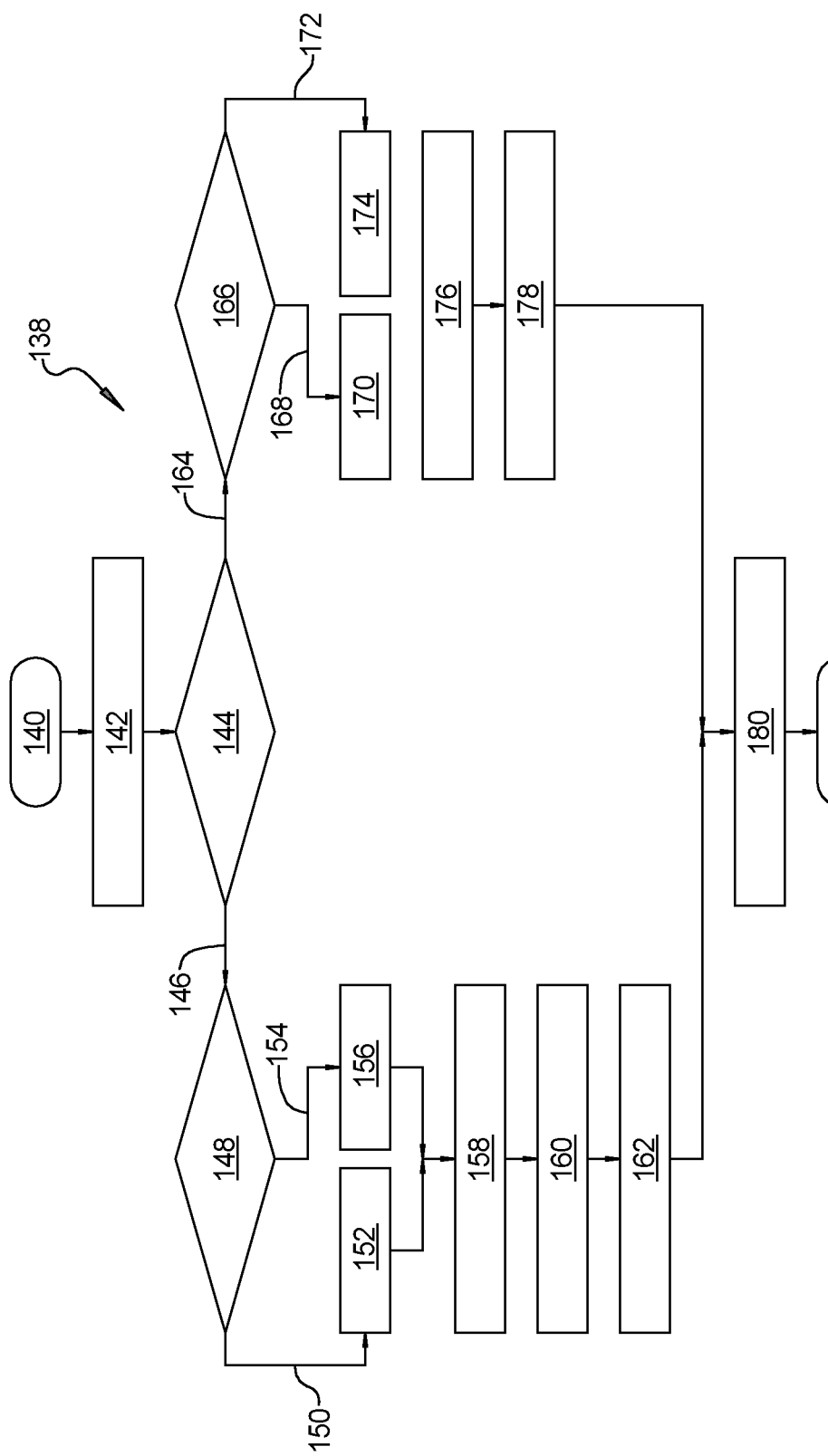

Referring to FIG. 6 and again to FIG. 5, using an operation chart 138 a method for operating the charging system for the electrical automobile vehicle 10 of the present disclosure during operation in the Topology III configuration may include the following. Following an operation start 140 a check 142 is performed to determine a charging port 26 status and voltage. In a charging determination 144 a determination is made if a charging operation of another vehicle the first switch 40 (SS1 in table 3) connected to the positive bus 28 and the second switch 42 (SS2 in table 3) connected to the negative bus 30 which allows charging operation start for the first automobile vehicle 12 from a charging station or charging grid. Following completion of the charge operation, in an opening step 178 commands are sent to open the first switch 40 (SS1 in table 3) and the second switch 42 (SS2 in table 3).

Following completion of either the opening operation 162 or the opening step 178, in a closing operation 180 commands are sent to close SS5 (fourth battery switch 128), SS6 (fifth battery switch 130), SS7 (sixth battery switch 132) and SS8 (seventh battery switch 134) if the first automobile vehicle 14 is a 400V system, or commands are sent to close SS6 (fifth battery switch 130), SS7 (sixth battery switch 132) and SS9 (eighth battery switch 136) if the first automobile vehicle 14 is an 800V system. An end operation signal 182 is then generated.

A charging system of an automobile vehicle reduces the charging time of a plug-in electric or hybrid vehicle having, for example, a nominal charging voltage that is equal to or less than 400V using a high power (i.e., 150 to 350 kW), higher voltage (i.e., 800V) charging station using a reconfigurable energy storage system. Vehicle charging controller to infrastructure (V-2-X) communication is used to determine the charging voltage of the charging station, or of a second vehicle requiring a charging operation prior to initiating charging. The present disclosed system enables increased charging rate of an electrified vehicle with a lower voltage (e.g., 400 VDC) storage device without increasing the current rating of charge port. The present disclosed apparatus enables the use of the new high power (i.e., 150 to 350 kW), higher voltage (i.e., 800 VDC) charger infrastructure (i.e., charging station) without replacing the low voltage (i.e., 400V) energy storage device and other propulsion system components such as the drive unit and the power inverter with higher voltage rated ones.

A charging system of an automobile vehicle of the present disclosure offers several advantages. These include an architecture which optimizes a vehicle range, enables vehicle-to-vehicle charging and enables vehicle charging port to vehicle charging. A voltage level requirement between a vehicle and a vehicle charging port is eliminated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A charging system of an electrical automobile vehicle, the charging system comprising:
   a converter unit within a first automobile vehicle;
   a first energy storage system of the first automobile vehicle;
   a charging cable releasably connected from the first energy storage system to a charging station or to a second energy storage system of a second automobile vehicle;
   a vehicle charging controller connected to the converter unit and programmed to communicate with the charging station and the second energy storage system; and
   a plurality of low-loss switching devices of the converter unit selectively operated by signals from the vehicle charging controller to position the plurality of low-loss switching devices in an on-state (ON) or an off-state (OFF) to control charging the first energy storage system from the charging station or charging the second energy storage system from the first energy storage system.

2. The charging system of the electrical automobile vehicle of claim 1, wherein the converter unit includes:
   a charge port individually connected to a positive bus and a negative bus; and
   a bi-directional DC/DC (BDD) converter with or without a bypass switch connected to the positive bus and the negative bus.

3. The charging system of the electrical automobile vehicle of claim 2, wherein:
   a first one (SS1) of the plurality of low-loss switching devices releasably connects the charge port to the positive bus; and
   a second one (SS2) of the plurality of low-loss switching devices releasably connects the charge port to the negative bus.

4. The charging system of the electrical automobile vehicle of claim 3, wherein:
   a third one (SS3) of the plurality of low-loss switching devices releasably connects the charge port to the positive bus of the BDD converter; and
   a fourth one (SS4) of the plurality of low-loss switching devices releasably connects the charge port to the negative bus of the BDD converter.

5. The charging system of the electrical automobile vehicle of claim 4, wherein the converter unit includes:
   a battery;
   a first battery switch defining a fifth one (SS5) of the plurality of low-loss switching devices connecting the battery to the positive bus;
   a second battery switch defining a sixth one (SS6) of the plurality of low-loss switching devices connecting the battery to the negative bus; and
   a pre-charging resistor connected to the battery and connected to or isolated from the positive bus using a pre-charging contactor defining a third battery switch (SS-PC).

6. The charging system of the electrical automobile vehicle of claim 5, wherein during a driving operation of the first automobile vehicle, the plurality of low-loss switching devices and the BDD converter are positioned as follows:
   SS1, SS2, SS3, SS4 are OFF;
   SS5 and SS6 are ON;
   SS-PC is OFF; and
   the BDD converter is energized ON.

7. The charging system of the electrical automobile vehicle of claim 5, wherein during a pre-charging operation of the first automobile vehicle, the plurality of low-loss switching devices and the BDD converter are positioned as follows:
   SS1, SS2, SS3, SS4 are OFF;
   SS5 is OFF;
   SS6 is ON;
   SS-PC is ON; and
   the BDD converter is energized OFF.

8. The charging system of the electrical automobile vehicle of claim 5, wherein during a charging operation of the second energy storage system using the first energy storage system, the plurality of low-loss switching devices and the BDD converter are positioned as follows:
   SS1, SS2 are OFF;
   SS3, SS4 are ON;
   SS5 and SS6 are ON;
   SS-PC is OFF; and
   the BDD converter is energized ON.

9. The charging system of the electrical automobile vehicle of claim 5, wherein during a charging operation of the first energy storage system from the charging station when the charging station is defined as a compatible charging station, the plurality of low-loss switching devices and the BDD converter are positioned as follows:

SS1, SS2 are ON;
SS3, SS4 are OFF;
SS5 and SS6 are ON;
SS-PC is OFF; and
the BDD converter is energized OFF.

10. The charging system of the electrical automobile vehicle of claim 5, wherein during a charging operation of the first energy storage system from the charging station when the charging station is defined as an incompatible charging station, the plurality of low-loss switching devices and the BDD converter are positioned as follows:
SS1, SS2 are OFF;
SS3, SS4 are ON;
SS5 and SS6 are ON;
SS-PC is OFF; and
the BDD converter is energized ON.

11. The charging system of the electrical automobile vehicle of claim 5, wherein the converter unit includes:
a module package having a traction power inverter module, an accessory power module and an air conditioning compressor module; and
an integrated power electronics module;
wherein the module package and the integrated power electronics module are connected across the positive bus and the negative bus.

12. The charging system of the electrical automobile vehicle of claim 11, wherein the converter unit includes:
a seventh one (SS7) of the plurality of low-loss switching devices releasably connecting the module package and the integrated power electronics module to the positive bus; and
an eighth one (SS8) of the plurality of low-loss switching devices releasably connecting the module package and the integrated power electronics module to the negative bus;
wherein during a driving operation of the first automobile vehicle SS7 and SS8 are ON; and
wherein during a pre-charging operation of the first automobile vehicle; during a charging operation of the second energy storage system using the first energy storage system, and during a charging operation of the first energy storage system from the charging station SS7 and SS8 are OFF.

13. A charging system of an electrical automobile vehicle, the charging system comprising:
a converter unit within a first automobile vehicle having a bi-directional DC/DC (BDD) converter with or without a bypass switch connected to a positive bus and a negative bus;
a charge port connected to the positive bus and the negative bus;
a first energy storage system of the first automobile vehicle including a dual battery package;
a charging cable releasably connected from the first energy storage system via the charge port to a charging station or releasably connected to a second energy storage system of a second automobile vehicle;
a vehicle charging controller connected to the converter unit and programmed to communicate with the charging station and the second energy storage system; and
a plurality of low-loss switching devices of the converter unit selectively operated by signals from the vehicle charging controller to position the plurality of low-loss switching devices in an on-state (ON) or an off-state (OFF) to control charging the first energy storage system from the charging station or charging the second energy storage system from the first energy storage system.

14. The charging system of the electrical automobile vehicle of claim 13, wherein the plurality of low-loss switching devices includes:
a first one (SS1) releasably connecting the charge port to the positive bus;
a second one (SS2) releasably connecting the charge port to the negative bus;
a third one (SS3) releasably connecting the charge port to the positive bus of an input of the BDD converter;
a fourth one (SS4) releasably connecting the charge port to the negative bus of an input of the BDD converter;
a fifth one (SS5) defining a first battery switch releasably connecting the battery to the positive bus; and
a sixth one (SS6) defining a second battery switch releasably connecting the battery to the negative bus.

15. The charging system of the electrical automobile vehicle of claim 14, further including a resistor connected to the battery and connected to or isolated from the positive bus using a pre-charging contactor defining a third battery switch (SS-PC).

16. The charging system of the electrical automobile vehicle of claim 15, further including switching logic including:

| Switching logic for various operating modes | | | | | | | | |
|---|---|---|---|---|---|---|---|---|
| | SS1 | SS2 | SS3 | SS4 | SS5 | SS6 | SS-PC | DBB |
| Normal driving | OFF | OFF | OFF | OFF | ON | ON | OFF | ON |
| Pre-charging | OFF | OFF | OFF | OFF | OFF | ON | ON | OFF |
| Charging from vehicle ESS | OFF | OFF | ON | ON | ON | ON | OFF | ON |
| Charging from the grid | ON | ON | OFF | OFF | ON | ON | OFF | OFF. |

17. The charging system of the electrical automobile vehicle of claim 15, further including:
a seventh one (SS7) of the plurality of low-loss switching devices releasably connects a module package and an integrated power electronics module to the positive bus; and
an eighth one (SS8) of the plurality of low-loss switching devices releasably connects the module package and the integrated power electronics module to the negative bus.

18. The charging system of the electrical automobile vehicle of claim 17, further including switching logic including:

| Switching logic for various operating modes | | | | | | | | | |
| --- | --- | --- | --- | --- | --- | --- | --- | --- | --- |
| | SS1 | SS2 | SS3 | SS4 | SS5 | SS6 | SS7 | SS8 | SS-PC | DBB |
| Normal driving | OFF | OFF | OFF | OFF | ON | ON | ON | ON | OFF | ON |
| Pre-charging | OFF | OFF | OFF | OFF | OFF | ON | OFF | OFF | ON | OFF |
| Charging from vehicle ESS | OFF | OFF | ON | ON | ON | ON | OFF | OFF | OFF | ON |
| Charging from the grid | ON | ON | OFF | OFF | ON | ON | OFF | OFF | OFF | OFF. |

19. The charging system of the electrical automobile vehicle of claim 13, wherein the dual battery package defines a first battery and a second battery, and wherein the plurality of low-loss switching devices includes:
- a first one (SS1) releasably connecting the charge port to the positive bus;
- a second one (SS2) releasably connecting the charge port to the negative bus;
- a third one (SS3) releasably connecting the charge port to the positive bus of an input of the BDD converter;
- a fourth one (SS4) releasably connecting the charge port to the negative bus of an input of the BDD converter;
- a fifth one (SS5) defining a first battery switch releasably connecting the first battery to the bus;
- a sixth one (SS6) defining a second battery switch releasably connecting the first battery to the negative bus;
- a seventh one (SS7) defining a first battery switch releasably connecting the second battery to the positive bus;
- an eighth one (SS8) defining a second battery switch releasably, connecting the second battery to the negative bus; and
- a ninth one (SS9) connecting the first battery to the second battery; and further including switching logic including:

| Switching logic for various operating modes | | | | | | | | | | | | | |
| --- | --- | --- | --- | --- | --- | --- | --- | --- | --- | --- | --- | --- | --- |
| | SS1 | SS2 | SS3 | SS4 | SS5 | SS6 | SS7 | SS8 | SS9 | SS10 | SS11 | SS-PC | BDD |
| Normal driving | OFF | OFF | OFF | OFF | ON | ON | ON | ON | OFF | ON | ON | OFF | ON |
| Pre-charging | OFF | OFF | OFF | OFF | OFF | ON | OFF | OFF | OFF | OFF | OFF | ON | OFF |
| Charging second vehicle ESS (400 V) | OFF | OFF | ON | ON | ON | ON | ON | ON | OFF | OFF | OFF | OFF | ON |
| Charging second vehicle ESS (800 V) | OFF | OFF | ON | ON | OFF | ON | ON | OFF | ON | OFF | OFF | OFF | ON |
| Charging from the grid (400 V) | ON | ON | OFF | OFF | ON | ON | ON | ON | OFF | OFF | OFF | OFF | OFF |
| Charging from the grid (800 V) | ON | ON | OFF | OFF | OFF | ON | ON | OFF | ON | OFF | OFF | OFF | OFF. |

20. A method for charging an electrical automobile vehicle, the method comprising:
- connecting a bi-directional DC/DC (BDD) converter to a converter unit within a first automobile vehicle;
- connecting the BDD converter and a charge port to a positive bus and a negative bus;
- providing a first energy storage system in the first automobile vehicle including a battery;
- releasably connecting a charging cable from the first energy storage system via the charge port to a charging station to charge the battery or releasably connecting the charging cable to a second energy storage system of a second automobile vehicle;
- programming a vehicle charging controller connected to the converter unit to communicate with the charging station and the second energy storage system; and
- selectively operating a plurality of low-loss switching devices of the converter unit using signals from the vehicle charging controller to position the plurality of low-loss switching devices in an on-state (ON) or an off-state (OFF) to control charging the first energy storage system from the charging station or charging the second energy storage system from the first energy storage system.

* * * * *